A. C. FORCE.
TRAP.
APPLICATION FILED AUG. 17, 1912.
1,064,633.
Patented June 10, 1913.
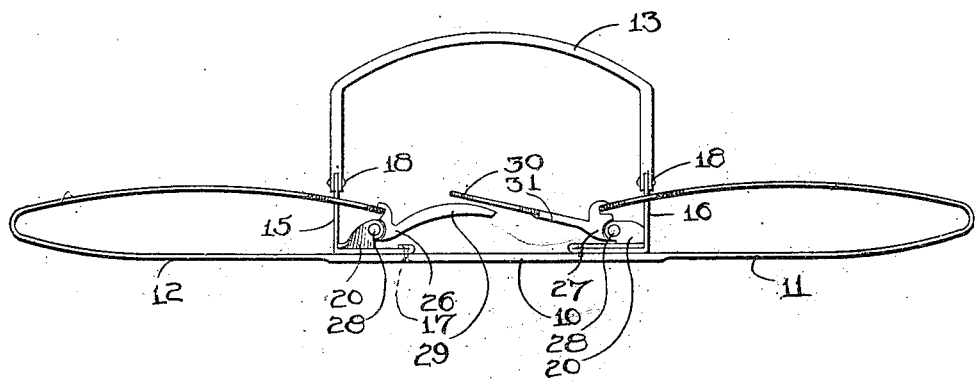
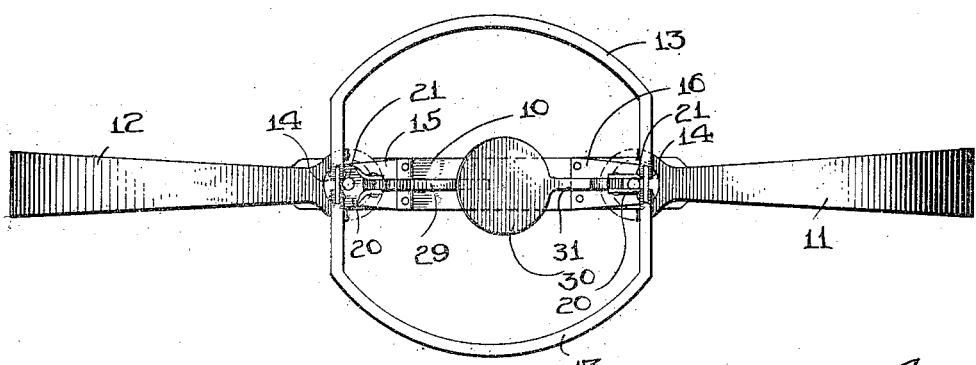
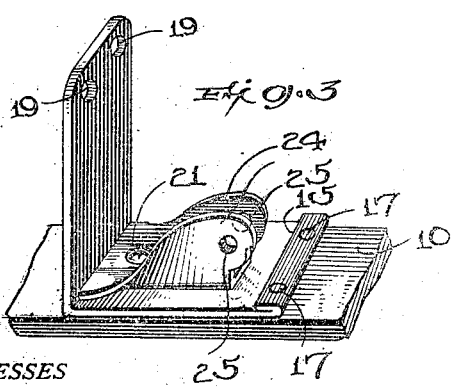
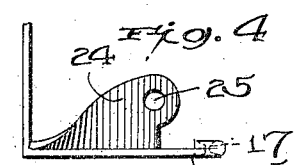
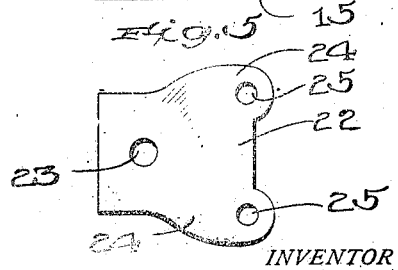
WITNESSES
INVENTOR
Arthur C. Force

UNITED STATES PATENT OFFICE.

ARTHUR C. FORCE, OF ROBERTS, IDAHO.

TRAP.

1,064,633.  Specification of Letters Patent.  Patented June 10, 1913.

Application filed August 17, 1912. Serial No. 715,604.

*To all whom it may concern:*

Be it known that I, ARTHUR C. FORCE, a citizen of the United States, residing at Roberts, in the county of Fremont and State of Idaho, have invented certain new and useful Improvements in Traps, of which the following is a specification, reference being had therein to the accompanying drawing.

This invention relates to spring traps in which there is provided a pair of pivotally mounted jaws which are normally held in a closed position by a pair of springs.

The principal object of the invention is to provide an improved type of trigger for holding the springs in a position to permit the jaws to remain open.

Another object of the invention is to provide an improved type of device for pivotally connecting the triggers with the brackets upon which the jaws are pivotally mounted.

In the accompanying drawings:—Figure 1 is a side elevation of the trap with the jaws in a closed position and the springs held in a position to permit the jaws to be opened. Fig. 2 is a top plan view of the trap in a set position with the jaws opened. Fig. 3 is an enlarged perspective view showing the manner of constructing and mounting the pivot ears of the triggers and the brackets with which the jaws are pivotally connected. Fig. 4 is a side elevation of the bracket and pivot ears. Fig. 5 is a view of the blank from which the pivot ears are formed.

This invention comprises a center bar 10 having the resilient arms 11 and 12 extending from the end portion, the arms 11 and 12 being formed integral with the center bar 10 or being formed from separate pieces of metal and connected with the center bar in any desired manner as for instance by being welded to the center bar. These resilient arms form the springs which normally hold the jaws 13 in a closed position and are provided with enlarged end portions having openings 14 formed therein, through which the jaws pass.

Brackets 15 and 16 are secured to the end portions of the center bar each having its lower end portion doubled as clearly shown in Figs. 1 and 2, in order to reinforce the lower portions of the brackets. Rivets 17 are passed through the doubled portions of the brackets so that the brackets will be rigidly connected with the center bar 10.

The jaws 13 are pivotally connected with the brackets 15 and 16 by means of the rivets 18 which pass through the bifurcated ends of the jaws and through the openings 19 formed in the upper portions of the brackets. From inspection of Fig. 1 it will be seen that when the resilient arms are bent to permit the jaws to be opened that the brackets pass through the openings 14, thus completely bringing the springs from out of engagement with the jaws and permitting them to be bent without any danger of the springs closing the jaws while opening the same as often happens when the springs are at all times in engagement with the jaws, and the jaws have to be held opened while the springs are connected with the triggers.

Pivot ears 20 are rigidly connected with the center bar 10 by means of the rivets 21, the outer end of each of the pivot ears fitting tightly against the vertical portion of the bracket in order to prevent the pivot ears from having any transverse pivotal movement. These pivot ears are each formed from a blank 22 which is shown in Fig. 5, and which is provided with the opening 23 through which the rivet 21 passes and with the side wings 24 which are bent to form the upwardly extending flanges having the openings 25.

Triggers 26 and 27 are pivotally mounted upon pivot pins 28 passing through the openings 25 and are adapted to engage the end portions of the springs in order to hold the springs in a contracted position as shown in Fig. 1. The trigger 26 is provided with a lever 29 which is positioned beneath a plate 30 formed at the end of the lever 31 extending from the trigger 27. It will be seen that when the trap is set and is released by an animal placing its foot upon the plate 30 that the plate will come in contact with the lever 29, thereby releasing the spring 12 from the trigger 26. It should also be noted that this lever 29 is curved as clearly shown in Fig. 1 in order to form a cam surface, thus causing the lever to be released a great deal easier than it would be if it were straight throughout its length.

When setting this trap the spring 12 is bent and its inner end engaged by the trigger 26 and the spring 12 is likewise bent and engaged by the trigger 27. The springs will then be entirely out of engagement with the jaws and these jaws can now be very easily turned to the opened position as shown in Fig. 2, and the trap is ready for use. If desired, bait may be secured to the plate 30 or if desired the trap may be placed in a runway along which animals are accustomed to pass and positioned so that the animal will step upon the plate 30 when passing along the runway. As soon as the animal places its foot upon the plate 30 the lever 31 will be depressed thereby releasing the spring 11 and permitting it to close the jaws 13. At the same time the plate will come in contact with the lever 29 thereby releasing the spring 12 from the trigger 26 and permitting it to expand thereby assisting the spring 11 in holding the jaws closed.

Having thus described the invention what is claimed as new, is:—

1. A trap comprising a center bar, resilient arms extending from said center bar and bent to form springs having perforated free ends, brackets secured to the end portions of said center bar and passing through the perforations of said springs when said springs are bent to a contracted position, jaws passing through the perforations of said springs and pivotally connected to the upper end portions of said brackets, pivot ears mounted upon the lower portions of said brackets, and having their outer ends fitting tightly against the vertical portions of said brackets to prevent pivotal movement of said pivot ears, each of said pivot ears being formed from a blank having perforated side wings bent to form vertically extending flanges, triggers pivotally mounted between the flanges of said pivot ears and adapted to engage the free ends of said resilient arms, a curved lever extending from one of said triggers, and a lever extending from the other of said triggers and provided with a trip plate at its free end portion positioned above the first mentioned lever.

2. A trap comprising a center bar, brackets mounted upon said center bar, jaws pivotally connected with the upper end portions of said brackets, pivot ears secured to the lower portions of said brackets and having their outer ends contacting with the vertical portions of said brackets to prevent pivotal movement of said pivot ears, springs carried by said center bar for normally holding said jaws in a closed position, triggers pivotally connected with said pivot ears and adapted to engage said springs to hold the same in a contracted position, a curved lever extending from one of said triggers, and a lever extending from the other of said triggers and provided with a trip plate at its free end portion above the end portion of said first mentioned lever.

In testimony whereof I hereunto affix my signature in presence of two witnesses.

ARTHUR C. FORCE.

Witnesses:
  F. M. CALDWELL,
  WM. E. WHITLATCH.